United States Patent Office 3,829,287
Patented Aug. 13, 1974

3,829,287
HIGH STRENGTH LIQUID METALLIZED
AZO COLORANTS
Alvin Carl Litke, West Seneca, N.Y., assignor to Allied
Chemical Corporation, New York, N.Y.
No Drawing. Filed Feb. 22, 1972, Ser. No. 228,390
Int. Cl. D06p 1/10
U.S. Cl. 8—42 R                                    4 Claims

ABSTRACT OF THE DISCLOSURE

High strength liquid azo colorants, especially suitable for coloring paper, are prepared by metallizing certain azo dyestuffs in a solution of diethanol amine. The diethanol amine not only aids in the metallization of the azo dyestuffs but allows the metallized dyestuff to remain in solution. Liquids of diverse color strength can be produced by varying the amounts of dyestuff in the solution.

BACKGROUND OF THE INVENTION

The present invention relates in general to the metallization of azo dyestuffs. More particularly the present invention relates to concentrated liquid metallized azo dyestuffs and methods for their preparation.

One of the outstanding advantages of azo dyeings is their fastness in contrast to that of other dyes. The fastness of azo dyeings is known to be improved by metallizing, i.e., by treating the azo dyes with various metallizing agents such as copper, cobalt, chromium, nickel and the like. Presently, metallized azo dyestuffs are applied to articles such as paper in powder form, i.e., they are produced by the metallization of the azo dyestuffs in an alkaline solution, usually a solution of ammonium hydroxide, precipitated from the solution, dried and crushed into powder form. A stock dyeing solution is thereafter prepared from the powdered dyes. While powder dyestuffs have been found to impart the desired shades with the desired degree of fastness on articles such as paper, difficulties do arise in the handling of the powdered dyes which tend to form dust etc., and as a consequence new methods are constantly being sought for applying the dyestuffs to paper-type products.

The use of liquid colorants to impart color to paper-type products would be a noteworthy solution to the problems mentioned. However, until this time, methods for producing liquid metallized azo dyestuffs have either been unavailable or too expensive to be economical in the coloring of paper-type products.

It is therefore an object of this invention to provide a concentrated liquid metallized azo dyestuff easily handled in preparing stock dye solutions.

It is a further objection of this invention to provide a concentrated liquid metallized azo dyestuff having a high color strength and a high degree of fastness.

It is a further object of this invention to provide a process for producing high strength liquid metallized azo dyestuffs.

It is yet a further object of this invention to provide a process for producing high strength liquid metallized azo dyestuffs in a simple economic manner.

These and other objects will become apparent from the description given hereinafter.

SUMMARY OF THE INVENTION

Briefly, in accordance with this invention there is provided a liquid colorant composition comprising a metallized azo dyestuff dissolved in a solution consisting essentially of diethanol amine and water. Depending on the desired strength, the metallized azo dyestuff will be present in the solution in amounts from between about 5 to 30 weight percent of the solution. The azo dyestuff which is metallized with a metal such as copper, cobalt, chromium, nickel or the like, preferably copper, is a disazo dye having the formula

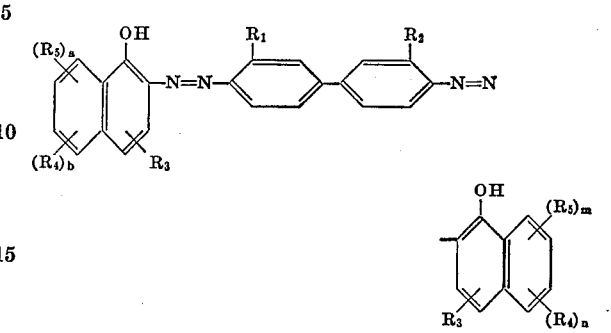

wherein $R_1$ and $R_2$ are individually lower alkoxy containing from 1 to 6 carbon atoms or hydroxy. $R_3$, $R_4$ and $R_5$ are individually at each occurence hydrogen, NHR or $SO_3M$ wherein R is hydrogen or a lower alkyl containing 1 to 6 carbon atoms and M is hydrogen or an alkali metal; and $a$, $b$, $m$ and $n$ are integers of from 1 to 2 with the proviso that the sum of $m$ and $n$ does not exceed 2 and the sum of $a$ and $b$ does not exceed 2. The metallized disazo dyes are represented by the formula

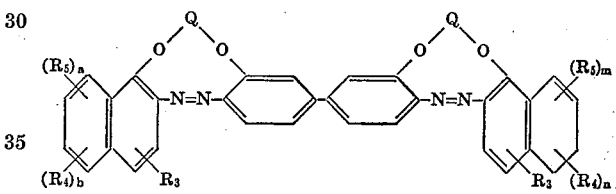

wherein $R_3$, $R_4$, $R_5$, $m$ and $n$ are as defined above, and Q is copper, nickel, cobalt or chromium.

The liquid colorants of this invention are produced by admixing with a disazo dye having the formula given above, a hydroxide or salt of the metals above mentioned in a solution consisting essentially of water and diethanol amine. Ordinarily the metallization of the azo dyestuffs is initiated by gently heating the solution to reflux. After the metallization is complete the solution is allowed to cool and then filtered to remove any insolubles present. The fact that diethanol amine may be employed to produce the high strength liquid colorants of the present invention is surprising inasmuch as the monoethanol amine and triethanol amine do not give the desired results but produce either a change in color or a very weakly colored solution.

DETAILED DESCRIPTION OF THE INVENTION

The metallizing compounds capable of forming a metal complex to produce the liquid colorants of the present invention with the azo dyestuffs can be either water-soluble or dispersible salts and hydroxides of copper, nickel, chromium or cobalt, preferably copper, usually in the form of chlorides, sulfates, nitrates, formates, acetates, propionates and butyrates.

The amount of metallizing compound which may be employed for complexing with the azo compounds will usually depend upon a degree of metallization desired. While molar ratios are required for complete metallization, the amount employed can be varied from 2 mol equivalents to an excess of 2 mol equivalents of metal per mol equivalent of dyestuff. When less than an equivalent amount of metal is employed, unreacted, i.e., unmetallized azo dye is present which is usually undesirable.

The disazo dyestuffs which are metallized in accordance with this invention are obtained by coupling known tetrazotized diphenyl compounds of the formula

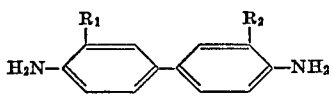

wherein $R_1$ and $R_2$ are as previously defined, with a known hydroxynaphthalene compound of the formula

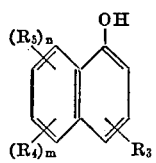

wherein $R_3$, $R_4$, $R_5$, $m$ and $n$ are as previously defined. The coupling reaction is carried out in a known manner, usually in an alkaline medium, optionally in the presence of organic nitrogen bases which facilitate the coupling such as pyridine and homologs thereof, trialkyl amines or tertiary alkanol amines.

Illustrative of the diphenyl compounds which may be tetrazotized in the usual, known manner and employed in the production of the disazo dyes metallized in accordance with this invention are 4,4'-diamino-3,3'-dimethoxydiphenyl; 4,4'-diamino-3,3'-diethoxydiphenyl; 4,4'-diamino-3,3'-dihydroxydiphenyl; 4,4'-diamino-3-methoxy-3'-hydroxydiphenyl; 4,4'-diamino-3-ethoxy-3'-methoxydiphenyl, and the like.

The hydroxynaphthalene compounds which may be employed to form the disazo compounds which are metallized in accordance with this invention are those which couple in a position ortho the hydroxy group. Illustrative of such hydroxynaphthalenes are:

1-hydroxynaphthalene-3,6-disulfonic acid
1-hydroxynaphthalene-3,6,8-trisulfonic acid
1-hydroxynaphthalene-3,6-sodium sulfonate
1-hydroxynaphthalene-6-sodium sulfonate
1-hydroxy-8-aminonaphthalene-3-sulfonic acid
1-hydroxy-8-aminonaphthalene-3,6-disodium sulfonate
1-hydroxy-6-aminonaphthalene-3-lithium sulfonate
1-hydroxy-6,8-diaminonaphthalene-3-sodium sulfonate
6-amino-4-hydroxynaphthalene-2-sodium sulfonate
6-acetyl amino-1-naphthol-3-sodium sulfonate
4-hydroxynaphthalene-1-sulfonic acid
3-amino-5-hydroxynaphthalene-2,7-disodium sulfonate
4-amino-5-hydroxynaphthalene-1-sulfonic acid
4-amino-5-hydroxy-3-sodium sulfonate-1-naphthalene sulfonic acid
3-hydroxynaphthalene-2,7-disodium sulfonate
6-hydroxynaphthalene-2-sodium sulfonate and other like hydroxynaphthalene compounds.

Upon metallization, with, e.g. copper in the form of coppersulfate, a complex is formed which has the formula

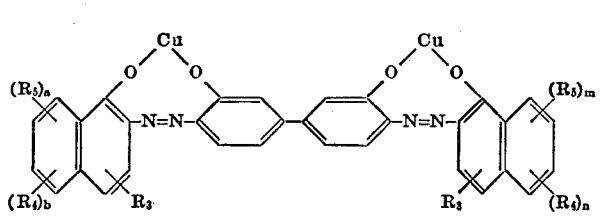

wherein $R_3$, $R_4$, $R_5$, $a$, $b$, $m$ and $n$ are as defined above.

The amount of diethanol amine in the aqueous solution carrying the metallized azoic dyestuff of this invention is critical only to the extent that the liquid colorant possessed the desired shade of color and fastness to light. Generally the amount of diethanol amine will be between 25 and 75 weight percent of the solution, again depending upon the desired result. It should be understood that when the colorant is metallized in the solution, the solution may be diluted or concentrated after the metallization reaction occurs.

In accordance with this invention, the presence of ammonia or ammonium salts which have conventionally been employed in metallization of disazo dyestuffs should be avoided, that is, the solution should be ammonia-free. The reason for this is that the ammonia or ammonium radical will cause the metallized dyestuff to precipitate which would defeat the object of the present invention, which is to produce concentrated liquid colorants. When ammonia is present in the solution, it is possible to obtain a liquid colorant, however, the strength of the liquid colorant so produced is so weak as to render it useless for all practical purposes as a liquid colorant.

It is also critical to the present invention that diethanol amine be employed as the active component in the aqueous solution since, as will be seen from the examples given below, monoethanol amines results in a very weak dyestuff as compared to the diethanol amine and, triethanol amine results in a change in color which is of course undesirable.

DETAILED DESCRIPTION OF PREFERRED EMBODIMENTS

The following examples are given by way of illustration only and not to be considered limiting in any manner. The term "percent dyeing strength" as used in the examples refers to the comparative strength of the liquid colorant as opposed to a powdered colorant when measured with a spectrophotomer, powdered dyestuff being considered 100%.

Example 1

To a mixture of 200 cc. of water and 125 grams of diethanol amine there were added 75 grams of $CuSO_4 \cdot 5H_2O$ with agitation until the copper sulfate dissolved. 300 grams of an aqueous press cake of a dyestuff having the formula

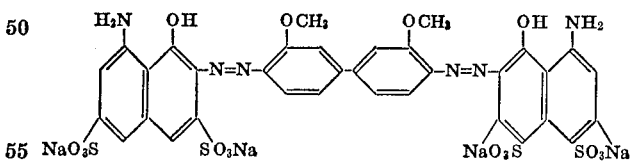

was thereafter added and the solution heated to a gentle reflux at 100 to 102° C. for about sixteen hours. Thereafter the solution was allowed to cool and was passed through a 200 mesh screen into a collection bottle. The resulting solution of dyestuff, identified as National Blue 10GL Liquid C–5279 had a dye strength of 53% compared to the same powdered dyestuff.

Example 2

To 100 cc. of water containing 68.2 grams of the dianisidine dyestuff described in Example 1 were added 115 grams of diethanol amine and 63.5 grams of hydrated copper sulfate. The entire mixture was heated to reflux at about 100° C. until metallization was complete. Thereafter, the solution was cooled and screened through a 200 mesh screen resulting in a liquid colorant having a dye strength of 45% compared to an identical powdered dye.

Example 3

The following series of experiments were run to compare the performance of diethanol amine with monoethanol amine and triethanol amine. Three solutions were prepared identified as (A), (B) and (C).

(A) Contained 230 grams of the dianisidine dyestuff identified in example 1, 60 grams of diethanol amine, 30 grams of copper sulfate and 28 grams of water. Solution (B) was identical to solution (A) with the exception that triethanol amine replaced the diethanol amine and solution (C) was identical to solution (A) with the exception that monoethanol amine replaced the diethanolamine. All three solutions were slurried until solution occurred and thereafter transferred to a heating flask when they were heated to reflux at about 100° C. for about 12 hours. Solutions (A) and (B) were blue in color and solution (C) was a pale brownish color apparently due to decomposition which occurred during the heating. Solution (A) containing the diethanol amine had a comparative dye strength of 55 percent and solution (B) a comparative dye strength of 11 percent compared to powdered dyes of the same composition.

It can be seen from the above examples that the dissolution of metallized disazo dyes in diethanol amine and water results in a liquid colorant having unexpectedly high color strength. The liquid colorant can be introduced into a stock coloring solution for coloring paper, without the difficulties encountered in the use of powdered dyestuffs, and thereafter applied onto the product to be dyed or colored. The fact that the colorant is in liquid form allows metering of the dye into the stock solution and onto the object to be colored. It can also be seen that the monoethanol amine and triethanol amine result in inferior and unacceptable coloring products.

It should be understood that the order of introduction of azo dyestuffs, diethanol amine, and metallizing compound, e.g., copper sulfate, has no criticality in the production of the liquid colorants of this invention.

What is claimed is:

1. A liquid colorant composition comprising a solution of water, diethanol amine and a metallized dye having the formula

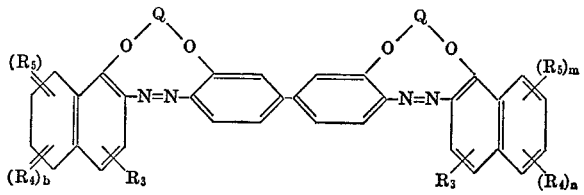

wherein $R_3$, $R_4$ and $R_5$ are individually at each occurrence hydrogen, NHR or $SO_3M$ wherein R is hydrogen or a lower alkyl containing 1–6 carbon atoms and M is hydrogen or an alkali metal, $a$, $b$, $m$ and $n$ are integers of from 1 to 2 with the proviso that the sum of $a$ and $b$ does not exceed 2 and that the sum of $m$ and $n$ does not exceed 2 and Q is a metal selected from the group consisting of copper, cobalt, nickel and chromium, said solution being free of ammonia and ammonium ions.

2. The composition as defined in claim 1 wherein the diethanol amine is present in an amount of between 25 and 75 weight percent of the water.

3. The composition as defined in claim 1 wherein Q is copper.

4. The composition as defined in claim 3 wherein $R_3$ and $R_4$ are —$SO_3Na$, $R_5$ is —$NH_2$ and $a$, $b$, $m$ and $n$ are each 1.

References Cited

UNITED STATES PATENTS

| | | | |
|---|---|---|---|
| 3,092,429 | 9/1937 | Straub et al. | 8—88 X |
| 2,662,806 | 12/1953 | Menzi et al. | 8—42 R |
| 2,828,180 | 3/1958 | Sertorio | 8—62 |
| 3,537,807 | 11/1970 | Streck | 8—7 |

LEON D. ROSDOL, Primary Examiner

B. H. HESS, Assistant Examiner

U.S. Cl. X.R.

8—7, 88

UNITED STATES PATENT OFFICE
CERTIFICATE OF CORRECTION

Patent No. 3,829,287    Dated August 13, 1974

Inventor(s) ALVIN CARL LITKE

It is certified that error appears in the above-identified patent and that said Letters Patent are hereby corrected as shown below:

Col. 6, Claim 1 that part of the formula which reads

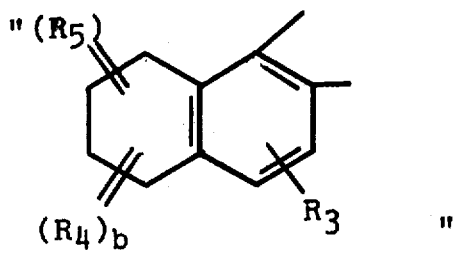

should read

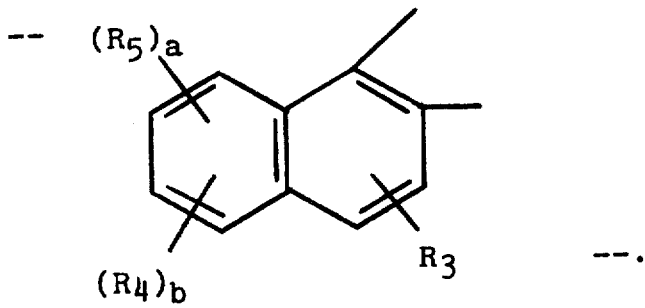

Signed and sealed this 19th day of November 1974.

(SEAL)
Attest:

McCOY M. GIBSON JR.
Attesting Officer

C. MARSHALL DANN
Commissioner of Patents